United States Patent
Beuerman et al.

(10) Patent No.: US 6,268,995 B1
(45) Date of Patent: Jul. 31, 2001

(54) DOUBLE-BELLOWS VACUUM VARIABLE CAPACITOR

(75) Inventors: Douglas M. Beuerman, Fort Collins, CO (US); Mark H. Burleson, Willow Springs, IL (US)

(73) Assignee: Jennings Technology, San Jose, CA (US)

( * ) Notice: Subject to any disclaimer, the term of this patent is extended or adjusted under 35 U.S.C. 154(b) by 0 days.

(21) Appl. No.: 09/590,666

(22) Filed: Jun. 8, 2000

(51) Int. Cl.[7] ....................................... H01G 5/00
(52) U.S. Cl. .................. 361/277; 361/277; 361/278; 361/279; 361/282
(58) Field of Search ..................... 361/271, 277, 361/278, 279, 282, 283.1, 291, 292, 296, 298

(56) References Cited

U.S. PATENT DOCUMENTS

| | | | |
|---|---|---|---|
| 2,930,952 | * | 3/1960 | Glauber ............................. 317/245 |
| 3,496,431 | * | 2/1970 | Goetzl .............................. 317/245 |
| 3,571,667 | * | 3/1971 | Joseph ............................. 317/243 |
| 3,746,811 | * | 7/1973 | Satio ................................. 200/144 |
| 4,177,495 | * | 12/1979 | Perret .............................. 361/279 |
| 4,428,025 | * | 1/1984 | King ................................ 361/274 |
| 4,953,057 | * | 8/1990 | Davidian ......................... 361/279 |
| 5,590,015 | | 12/1996 | Planta et al. ................... 361/277 |

FOREIGN PATENT DOCUMENTS

| | | |
|---|---|---|
| 643 681 | 6/1984 | (CH) . |
| 656 740 A5 | 7/1986 | (CH) . |
| 2 076 224 | 11/1981 | (GB) . |

* cited by examiner

Primary Examiner—Dean A. Reichard
Assistant Examiner—Nguyen T Ha
(74) Attorney, Agent, or Firm—Marshall, O'Toole Gerstein, Murray & Borun

(57) ABSTRACT

A vacuum variable capacitor includes a vacuum bellows for allowing a pressure differential between two volumes inside the capacitor, wherein one of the volumes may be a vacuum volume. The vacuum variable capacitor further includes a conductive bellows disposed within the vacuum volume. In such an arrangement, the materials selected for the vacuum bellows and the conductive bellows may be selected to optimize the function of each bellows.

20 Claims, 4 Drawing Sheets

DOUBLE-BELLOWS VACUUM VARIABLE CAPACITOR

BACKGROUND OF THE INVENTION

The present invention is directed to variable capacitors and, more particularly, to double-bellows vacuum variable capacitors.

A known water-cooled vacuum variable capacitor 10 previously marketed by Jennings Technology, the owner of this patent, having a double-bellows configuration is shown partially in section in FIG. 1. The capacitor 10 generally included a variable end assembly 12 and a fixed end assembly 14 connected together by a body assembly 16. The end assemblies 12, 14 were typically fabricated from steel and, in some instances, were partially silver plated. The body assembly 16 was an insulator such as, for example, ceramic that mechanically coupled the end assemblies 12, 14 while keeping the end assemblies 12, 14 electrically insulated from one another.

Inside the capacitor 10 was a fixed can structure 20 that formed the first half of the capacitor 10. The second half of the capacitor 10 was formed by a variable can structure 22, which was mounted to a variable can plate 24. To change the capacitance of the capacitor 10, the variable can structure 22 and the can plate 24 were moved with respect to the fixed can structure 20 through the use of an adjustment mechanism 30.

A vacuum bellows 36 was used to seal the adjustment mechanism 30 from the rest of the capacitor 10. The vacuum bellows 36 was sealed to both the variable end assembly 12 and the variable can plate 24 so that any volume outside the vacuum bellows 36, shown generally as reference numeral 38 in FIG. 1, could be evacuated by attaching a vacuum source to one or both cap seals 40, 42.

To facilitate cooling, the capacitor 10 included a water jacket bellows 44. The water jacket bellows 44 was disposed between the vacuum bellows 36 and the adjustment mechanism 30 and was sealed between the variable can plate 24 and the variable end assembly 12. To cool the capacitor 10, water was circulated through the volume between the vacuum and water jacket bellows 36, 44 (shown generally as reference numeral 46), via inlet/outlet ports 50, 52.

Typically, the vacuum and water jacket bellows 36, 44 were fabricated from C510 phosphor bronze and had no perforations or holes therein because holes or perforations would either make it impossible to establish the vacuum or would allow water to escape from between the bellows 36, 44. As shown in FIG. 1, the bellows 36, 44 were convoluted, or corrugated, to allow the bellows 36, 44 to flex as the variable can plate 24 was moved.

The force required to move the can plate 24 was proportional to the product of the cross sectional area of vacuum bellows 36 and the pressure differential across the vacuum bellows 36. Additionally, the current carrying capacity of the capacitor 10 was directly proportional to the diameter of the vacuum bellows 36, because the vacuum bellows 36 carried the current in the capacitor 10. Accordingly, the more current that the capacitor 10 needed to carry, the more force it took to move the can plate 24 of the capacitor 10.

During operation, the variable end and fixed end assemblies 12, 14 were connected into a circuit requiring capacitance. Current would flow between the variable end assembly 12 and the fixed end assembly 14 through the bellows 36, 44, which connected the variable end assembly 12 to the variable can plate 24. The variable can plate 24 was, in turn, capacitively coupled to the fixed end assembly 14, via the fixed and variable can structures 20, 22. As the capacitor 10 was operated, water was circulated through the volume 46 between the bellows 36, 44, via the inlet/outlet ports 50, 52. Additionally, a motor was usually coupled to the adjustment mechanism 30 to tune the capacitor 10 by moving the variable can plate 24.

SUMMARY OF THE INVENTION

The present invention is directed to variable capacitors, and more particularly to double-bellows vacuum variable capacitors.

According to a first aspect, the present invention may include a first electrical terminal structure, a second electrical terminal structure, a housing and a vacuum bellows disposed in the housing, the vacuum bellows having a first diameter, the vacuum bellows and at least a portion of the housing defining an interior vacuum chamber having a pressure disposed therein that is less than atmospheric pressure. Additionally the present invention may include a current-carrying bellows disposed in the housing, the current carrying bellows having a second diameter larger than the first diameter, the current-carrying bellows comprising a conductive material and surrounding the vacuum bellows, the current-carrying bellows being disposed in the interior vacuum chamber, the current-carrying bellows being conductively coupled to the second electrical terminal structure, a fixed-position capacitor structure conductively coupled to the first electrical terminal structure and a variable-position capacitor structure conductively coupled to the second electrical terminal structure, the variable-position capacitor structure being movable relative to the fixed-position capacitor structure to generate a variable capacitance between the capacitor structures.

The invention may also include a vacuum bellows fabricated from stainless steel and a current-carrying bellows fabricated from a metal having a high copper content, such as phosphor bronze. Additionally, the current-carrying bellows may be fabricated from a porous material or may be perforated.

According to a second aspect, the present invention may include a first electrical terminal structure, a second electrical terminal structure, a housing and a substantially air-tight separation member disposed in the housing, the substantially air-tight separation member and at least a portion of the housing defining an interior vacuum chamber having a pressure disposed therein that is less than atmospheric pressure. The present invention may also include a perforated current-carrying structure disposed in the housing, the current-carrying structure comprising a conductive material and being conductively coupled to the second electrical terminal structure, a fixed-position capacitor structure conductively coupled to the first electrical terminal structure and a variable-position capacitor structure conductively coupled to the second electrical terminal structure, the variable-position capacitor structure being movable relative to the fixed-position capacitor structure to generate a variable capacitance between the capacitor structures.

According to a third aspect, the present invention may include a first electrical terminal structure, a second electrical terminal structure, a housing and a substantially air-tight separation member disposed in the housing, the substantially air-tight separation member having a first diameter, the substantially air-tight separation member and at least a portion of the housing defining an interior vacuum chamber having a pressure disposed therein that is less than atmospheric pressure. The present invention may also include a current-carrying structure disposed in the housing, the current carrying structure having a second diameter larger than the first diameter, the current-carrying structure comprising a conductive material and surrounding the substantially air-tight separation member, the current-carrying structure being disposed in the interior vacuum chamber, the current-carrying structure being conductively coupled to the second electrical terminal structure, a fixed-position capacitor structure conductively coupled to the first electrical terminal structure and a variable-position capacitor structure conductively coupled to the second electrical terminal structure, the variable-position capacitor structure being movable relative to the fixed-position capacitor structure to generate a variable capacitance between the capacitor structures.

The features and advantages of the invention will be apparent to those of ordinary skill in the art in view of the detailed description of the preferred embodiment, which is made with reference to the drawings, a brief description of which is provided below.

DETAILED DESCRIPTION OF VARIOUS EMBODIMENTS

Figure 1:
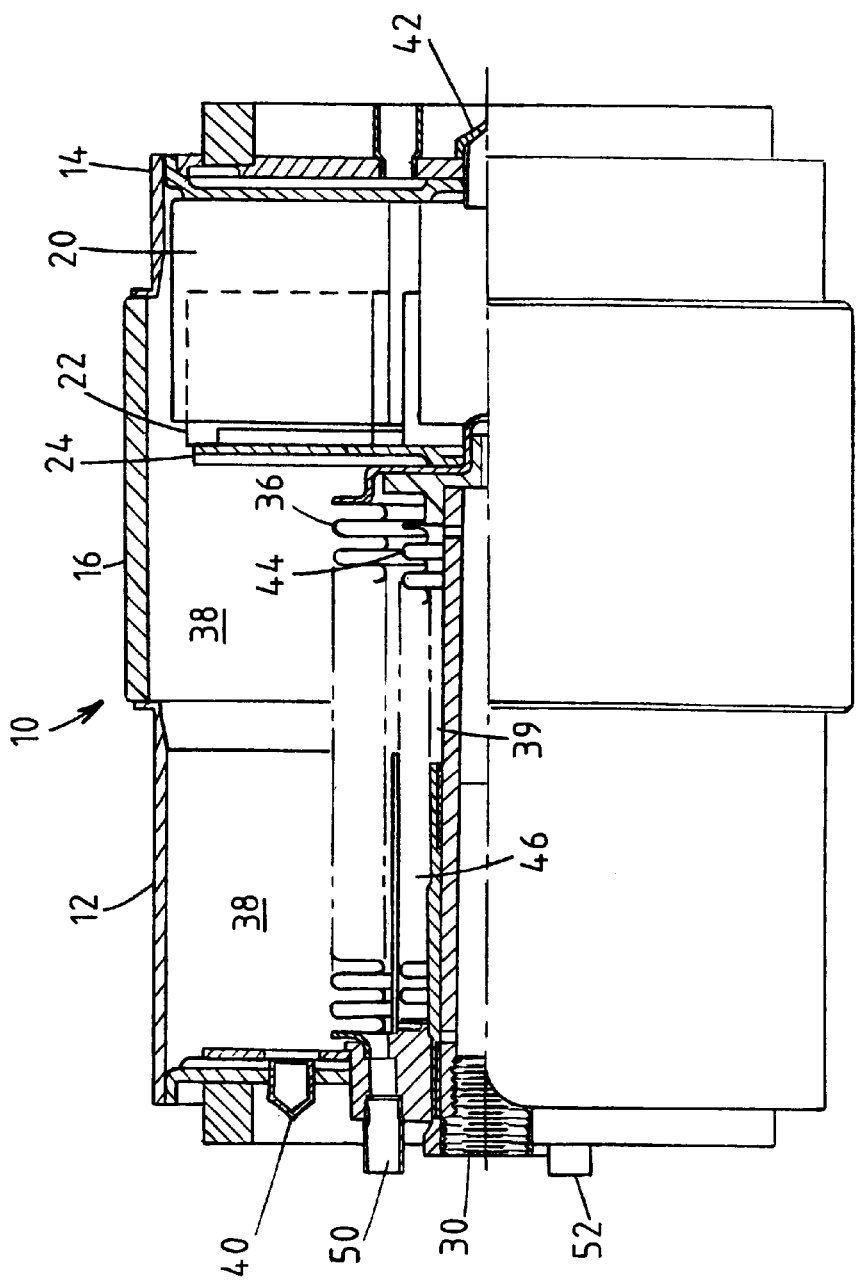
FIG. 1 is a side elevational view, partially in section, of a known water-cooled vacuum variable capacitor having two bellows.
Figure 2:
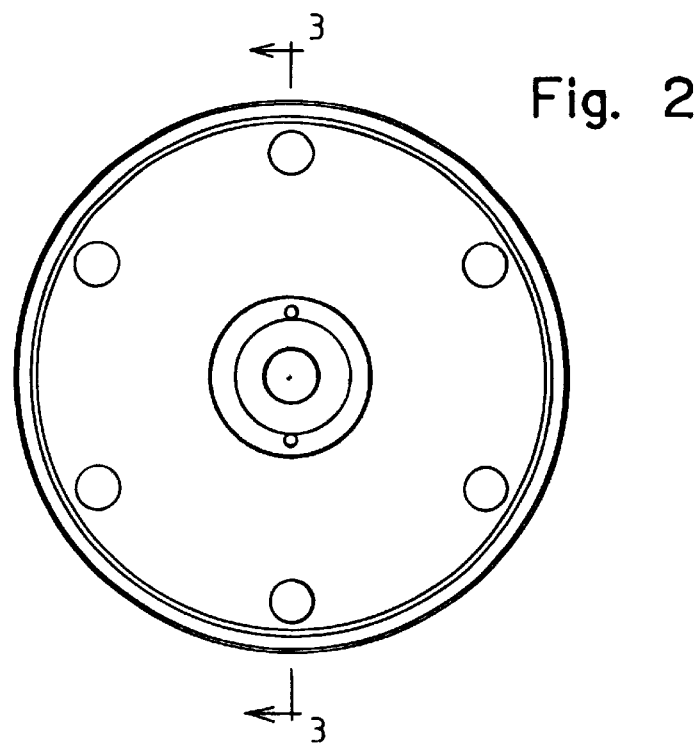
FIG. 2 is an end elevational view of one embodiment of a double-bellows vacuum variable capacitor in accordance with the present invention.
Figure 3:
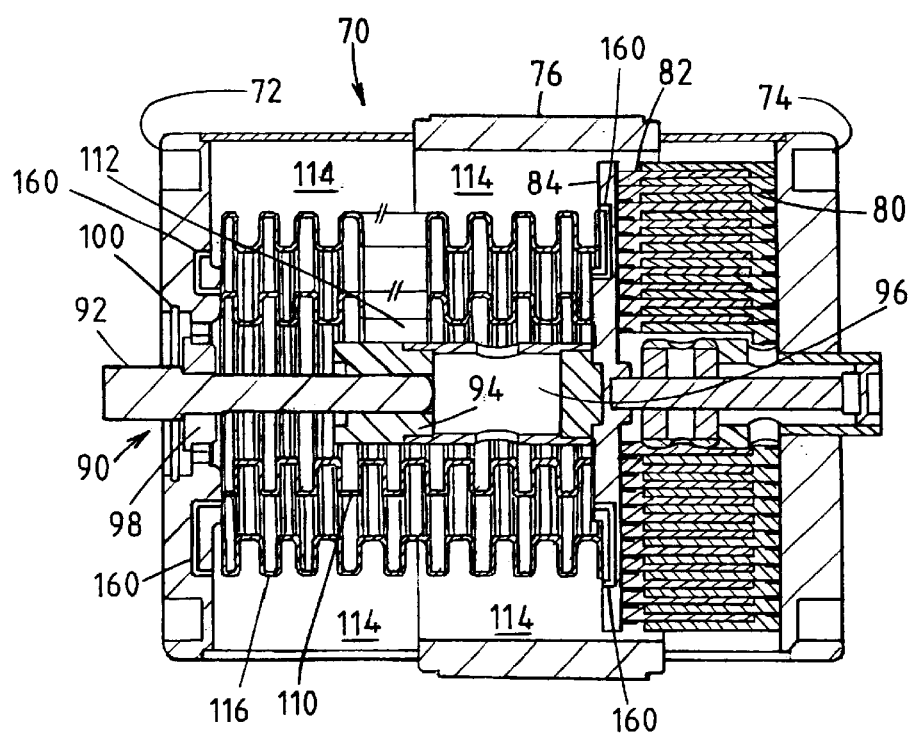
FIG. 3 is a side elevational view, partially in section, of the double-bellows vacuum variable capacitor taken generally along lines 3—3 of FIG. 2.

FIGS. 2 and 3 illustrate an embodiment of a double-bellows vacuum variable capacitor 70, in accordance with the invention, which may be provided with a housing including a variable end assembly 72, a fixed end assembly 74 and a body assembly 76, which may be fabricated from an electrical insulator such as ceramic. The variable and fixed end assemblies 72, 74 may be conductive terminal structures to which other circuitry or electrical components may be connected when the capacitor 70 is in operation.

A fixed position can structure 80 and a variable position can structure 82 are disposed inside the capacitor 70. The can structures 80, 82 may each include cylindrical, concentric members arranged such that concentric members of the fixed position can structure 80 may mesh or engage with concentric members of the variable position can structure 82 to create capacitive coupling therebetween. The degree to which the fixed and variable position can structures 80, 82 mesh or engage with one another dictates the capacitance between the fixed and variable end assemblies 72, 74. The fixed position can structure 80 may be mounted to the fixed end assembly 74, and the variable position can structure 82 may be mounted to a variable can plate 84, which may be electrically connected to the variable end assembly 72.

The degree to which the fixed and variable position can structures 80, 82 engage one another may be controlled by an adjustment mechanism 90, which may include a leadscrew 92, an adjust plug 94 and a shaft support plug 96. When the leadscrew 92 is turned, by a motor, by hand or by some other means, the adjust plug 94 may move axially with respect to the leadscrew 92 and may, in turn, cause the variable can plate 84 to move with respect to the leadscrew 92, thereby changing the degree to which the fixed and variable position can structures 80, 82 are spaced or engaged. A cartridge bearing 98, which may be retained by a retainer clip 100, may support the leadscrew 92 in the variable end assembly 72.

Referring to FIG. 3, a vacuum bellows 110, or any other substantially air-tight separation member may be fabricated from stainless steel or any other material able to withstand repeated flexing due to repeated movement of the variable can plate 84. The vacuum bellows 110, which may be sealed between the variable end assembly 72 and the variable can plate 84, may be corrugated to allow the variable can plate 84 to move axially with respect to the leadscrew 92, while maintaining the seal between the vacuum bellows 110 and the variable can plate 84. After the vacuum bellows 110 is installed in the capacitor 70, the vacuum bellows 110 may have a pressure differential between the inside and the outside thereof.

The volume inside the vacuum bellows 110, in which the adjustment mechanism 90 may be disposed, and which is generally represented by reference numeral 112, may be at atmospheric pressure and is referred to hereinafter as the atmospheric pressure volume 112. The volume outside the vacuum bellows 110, which may include the fixed and variable position can structures 80, 82, is represented by reference numeral 114 and may be referred to hereinafter as a vacuum volume 114 or a vacuum chamber. The vacuum volume 114 may have a pressure of −8 torr (mmHg) or any other suitable pressure that is lower than that of the atmospheric volume. In addition to providing a barrier to isolate the vacuum volume 114 from the atmospheric pressure volume 112, the vacuum bellows 110 may provide some electrical connectivity between the variable end assembly 72 and the variable can plate 84.

Still referring to FIG. 3, a conductive bellows 116 is disposed around and encloses the vacuum bellows 110 and is connected between the variable end assembly 72 and the variable can plate 84. The conductive bellows 116 may be fabricated from C510 phosphor bronze or any other suitable material having similar conductive properties. The conductive bellows 116 may electrically connect the variable end assembly 72 to the variable can plate 84. The variable can plate 84 may be, in turn, capacitively coupled to the fixed end assembly 74, via the fixed and variable position can structures 80, 82. As with the vacuum bellows 110, the conductive bellows 116 may be corrugated to allow the variable can plate 84 to move axially with respect to the leadscrew 92.

The torque required to turn the leadscrew 92 to move the variable can plate 84 of the capacitor 70 may be directly proportional to the cross sectional area of the vacuum bellows 110, due to the pressure diffferential across the vacuum bellows 110. Because the current carrying conductive bellows 116 does not have a pressure differential thereacross, the radius of the conductive bellows 116 may be increased to accommodate large currents without increasing the force required to move the variable can plate 84 or the torque required to turn the leadscrew 92. By disposing the conductive bellows 116 within the vacuum volume 114, the current carrying capacity of the capacitor 70 is not necessarily proportional to the torque required to turn the leadscrew 92 and the capacitor 70 may have a relatively high current carrying capacity and may be adjusted using a relatively low torque.

The use of both the vacuum bellows 110 and the conductive bellows 116 also allows the material used for each bellows 110, 116 to be optimized for its function. For example, because stainless steel can withstand repeated flexion without cracking or fracturing, stainless steel may be used as a vacuum bellows in a variable vacuum capacitor without losing its vacuum seal. Conversely, a highly conductive bellows fabricated from, for example, C510 phosphor bronze may not withstand repeated flexion while maintaining a vacuum seal. By using the two bellows in combination, the highly conductive bellows 116 need not be able to sustain a pressure differential between the inside and the outside thereof. In fact, as disclosed below with respect to FIG. 4, the conductive bellows 116 may be perforated or have slots cut therein, thereby assuring there will be no pressure differential between the inside and outside of the conductive bellows 116.

The use of two bellows 110, 116 also minimizes the axial force required to move the variable can plate 84 by minimizing the cross sectional area having a vacuum thereacross. Because the conductive bellows 116 does not have a pressure differential thereacross, the vacuum variable capacitor 70 may accommodate a relatively large current flow while requiring low torque to turn the leadscrew 92. By contrast, a vacuum variable capacitor using a single bellows fabricated from stainless steel would require more torque to turn the leadscrew 72 as the diameter of the bellows is increased to accommodate an increased current flow.

A lower axial force required to move the variable can plate 84 may result in a lower torque required to turn the leadscrew 92 to adjust the axial position of the variable can plate 84. Reduced torque and axial force may also reduce the wear and the tear on the adjustment mechanism 90 of the capacitor 70. Additionally, reduced torque and axial force may allow a smaller motor to be used to turn the leadscrew 92. Because of the optimal selection of material for both the vacuum bellows 110 and the conductive bellows 116 and the reduced axial force required to move the variable can plate 84, the use of two bellows, as disclosed herein may lengthen the life cycle of a vacuum variable capacitor by as much as 50%.

Figure 4:
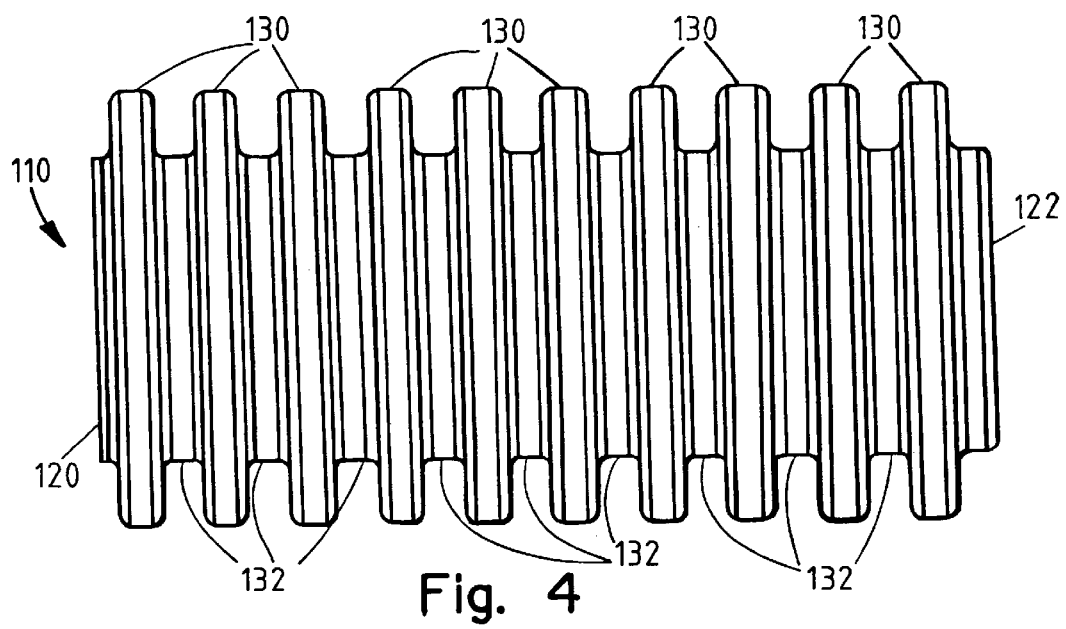
FIG. 4 is a side elevational view of the vacuum bellows of FIG. 3.

Referring now to FIG. 4 the vacuum bellows 110 (or a substantially air-tight sealing member) may be constructed from a material such as stainless steel having a thickness between approximately 0.006" and 0.008" and may include a first end 120 and a second end 122. Each of the first and second ends 120, 122 may be silver and/or nickel plated to form good seals or contact with the variable end assembly 72 and the variable can plate 84. Between the first and second ends 120, 122, the vacuum bellows 110 may be corrugated and, therefore, may have a plurality of large diameter portions 130 and a plurality of small diameter portions 132. Although the vacuum bellows 110 is shown in FIG. 4 as being corrugated, the vacuum bellows 110 may not be corrugated in all instances.

The vacuum bellows 110 may be designed to accommodate variable axial distances between the variable end assembly 72 and the variable can plate 84 during tuning of the capacitor 70. When the variable can plate 84 is relatively close to the variable end assembly 74, the small diameter portions 132 may axially compress between the large diameter portions 130 to accommodate the separation between the variable end assembly 72 and the variable can plate 84. Conversely, when the variable can plate 84 is relatively far from the variable end assembly 72, the vacuum bellows 110 may axially expand to accommodate the distance. Whether the distance between the variable end assembly 72 and the variable can plate 84 is large or small, the vacuum bellows 110 may axially expand or contract to preserve the pressure differential between its inside and its outside.

Figure 5:
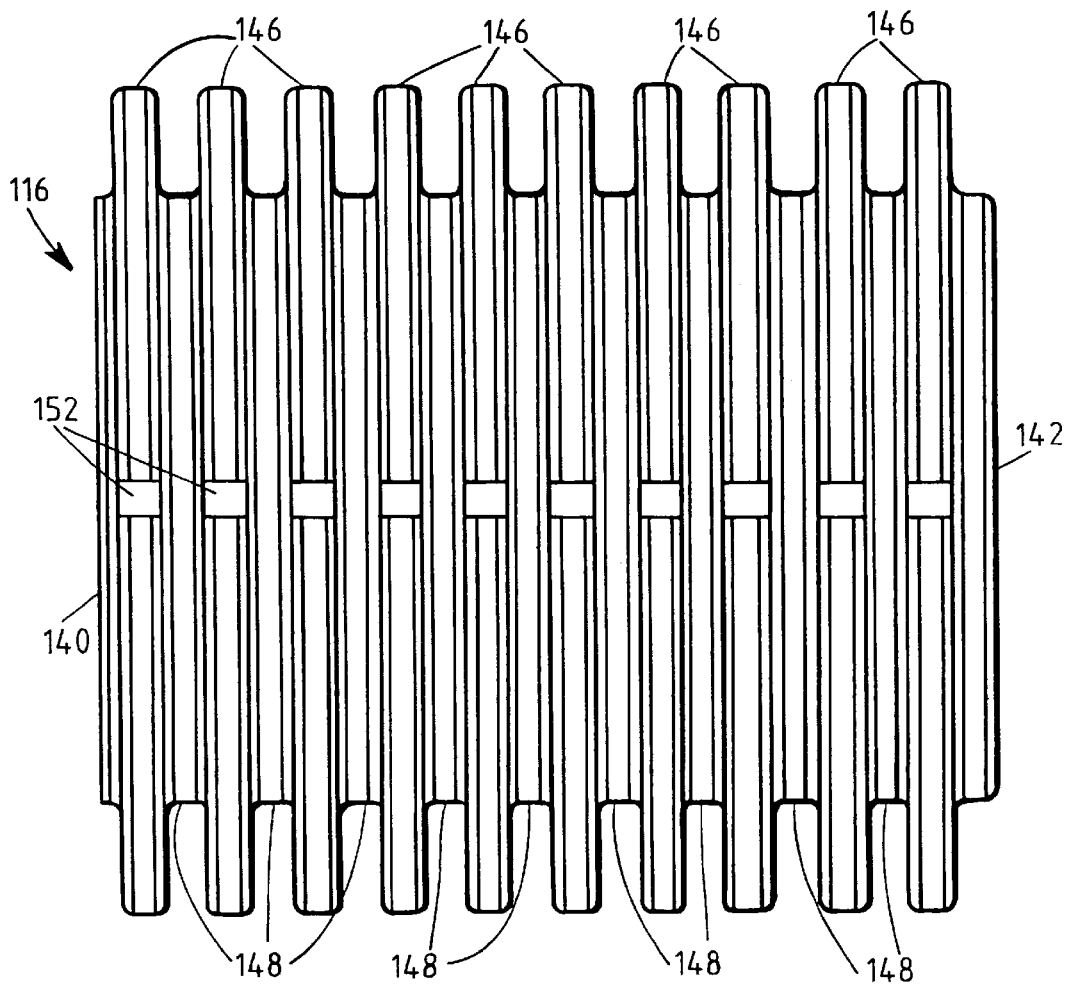
FIG. 5 is a side elevational view of the conductive bellows of FIG. 3.
Figure 6:
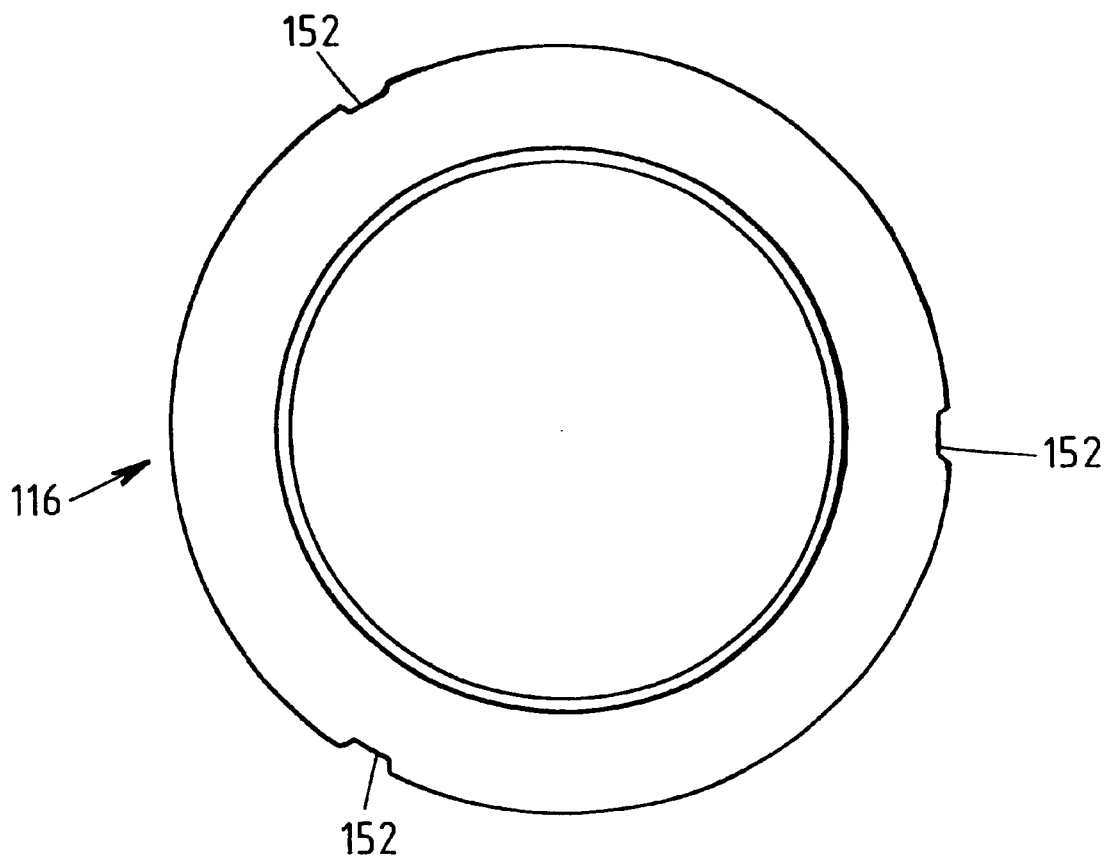
FIG. 6 is an end elevational view of the conductive bellows of FIG. 5.

Referring to FIGS. 5 and 6, the conductive bellows 116 (or current-carrying structure) may include first and second ends 140, 142, respectively. In a similar fashion to the vacuum bellows 110, the conductive bellows 116, may include a number of large diameter portions 146 and a number of small diameter portions 148. Like their corresponding portions in the vacuum bellows 110, these portions may axially expand or compress to accommodate the varying axial distance between the variable end assembly 72 and the variable can plate 84 as the capacitor 70 is tuned. Although the conductive bellows 116 is shown in FIG. 5 as being corrugated, corrugation is not necessarily required.

Unlike the vacuum bellows 110, which may be fabricated from stainless steel, the conductive bellows 116 may be fabricated from material between approximately 0.005" and 0.007" thick that has a high copper context (e.g., C510 phosphor bronze). Suitable materials may also include C102 or C103 (oxygen-free copper), C104, C105 or C106 (oxygen-free silver-copper) or C150 (zicronium-copper). Such materials may be highly conductive and may allow the vacuum variable capacitor 70 to accommodate higher currents than otherwise possible without the conductive bellows 116. Additionally, as shown in FIGS. 5 and 6, the conductive bellows 110 may include a plurality of slots 152. The slots 152 may be equally radially spaced around the circumference of the conductive bellows 116 and may be 0.025" in depth. The slots 152 ensure that there is no pressure differential across the conductive bellows 116. While FIGS. 5 and 6 show slots 152 in the conductive bellows 116, it will be readily appreciated by those having ordinary skill in the art that any perforations (including slots) in the conductive bellows 116 may be used. For example, perforations such as holes or punctures may be used in place of, or in addition to the slots 152. Additionally, a porous material may be selected for use as the conductive bellows 116.

Alternatively, the conductive bellows 116 may not be perforated or porous. Rather, the variable end assembly 72 and/or the variable can plate 84 may be machined to provide air channels or passages between the inside and the outside of the conductive bellows 116. Such air channels or passages enable air to pass between the inside and the outside of the conductive bellows 116 to ensure that there will be no pressure differential between the inside and the outside of the conductive bellows 116. Such passages may or may not be used in connection with a perforated conductive bellows 116. Exemplary passages in the variable end assembly 72 and the variable can plate 84 are shown at reference numeral 160 in FIG. 3.

In operation, the fixed and variable end assemblies 72, 74 of the vacuum capacitor 70 may be conductively coupled to circuitry or electrical components to provide a variable and adjustable capacitance. After the vacuum capacitor 70 is installed, the leadscrew 92 of the adjustment mechanism 90 may be turned, via a motor or any other suitable means, to adjust the position of the variable can plate 84, which in turn adjusts the capacitance of the capacitor 70.

Numerous additional modifications and alternative embodiments of the invention will be apparent to those skilled in the art in view of the foregoing description. For example, in addition to stainless steel, the vacuum bellows 110 may be fabricated from any other suitable material. Further, in addition to C510 phosphor bronze, the conductive bellows 116 may be fabricated from any other suitable material. This description is to be construed as illustrative only, and is for the purpose of teaching those skilled in the art the best mode of carrying out the invention. The details of the structure and method may be varied substantially without departing from the spirit of the invention, and the exclusive use of all modifications which come within the scope of the appended claims is reserved.

What is claimed is:

1. A variable capacitor, comprising:
   a first electrical terminal structure;
   a second electrical terminal structure;
   a housing;
   a vacuum bellows disposed in said housing, said vacuum bellows having a first diameter, said vacuum bellows and at least a portion of said housing defining an interior vacuum chamber having a pressure disposed therein that is less than atmospheric pressure;
   a current-carrying bellows disposed in said housing, said current carrying bellows having a second diameter larger than said first diameter, said current-carrying bellows comprising a conductive material and surrounding said vacuum bellows, said current-carrying bellows being disposed in said interior vacuum chamber, said current-carrying bellows being conductively coupled to said second electrical terminal structure;
   a fixed-position capacitor structure conductively coupled to said first electrical terminal structure; and
   a variable-position capacitor structure conductively coupled to said second electrical terminal structure, said variable-position capacitor structure being movable relative to said fixed-position capacitor structure to generate a variable capacitance between said capacitor structures.

2. The variable capacitor of claim 1, wherein the vacuum bellows comprises stainless steel.

3. The variable capacitor of claim 1, wherein the current-carrying bellows comprises a metal having a high copper content.

4. The variable capacitor of claim 1, wherein the current-carrying bellows comprises phosphor bronze.

5. The variable capacitor of claim 1, wherein the current-carrying bellows is porous.

6. The variable capacitor of claim 1, wherein the current-carrying bellows is perforated.

7. A variable capacitor, comprising:
   a first electrical terminal structure;
   a second electrical terminal structure;
   a housing;
   a substantially air-tight separation member disposed in said housing, said substantially air-tight separation member and at least a portion of said housing defining an interior vacuum chamber having a pressure disposed therein that is less than atmospheric pressure;
   a perforated current-carrying structure disposed in said housing, said perforated current-carrying structure comprising a conductive material and being conductively coupled to said second electrical terminal structure;
   a fixed-position capacitor structure conductively coupled to said first electrical terminal structure; and
   a variable-position capacitor structure conductively coupled to said second electrical terminal structure, said variable-position capacitor structure being movable relative to said fixed-position capacitor structure to generate a variable capacitance between said capacitor structures.

8. The variable capacitor of claim 7, wherein the substantially air-tight separation member comprises a vacuum bellows.

9. The variable capacitor of claim 8, wherein the vacuum bellows comprises stainless steel.

10. The variable capacitor of claim 7, wherein the perforated current-carrying structure comprises a conductive bellows.

11. The variable capacitor of claim 10, wherein the conductive bellows comprises a metal having a high copper content.

12. The variable capacitor of claim 10, wherein the conductive bellows comprises phosphor bronze.

13. A variable capacitor, comprising:
   a first electrical terminal structure;
   a second electrical terminal structure;
   a housing;
   a substantially air-tight separation member disposed in said housing, said substantially air-tight separation member having a first diameter, said substantially air-tight separation member and at least a portion of said housing defining an interior vacuum chamber having a pressure disposed therein that is less than atmospheric pressure;
   a current-carrying structure disposed in said housing, said current carrying structure having a second diameter larger than said first diameter, said current-carrying structure comprising a conductive material and surrounding said substantially air-tight separation member, said current-carrying structure being disposed in said interior vacuum chamber, said current-carrying structure being conductively coupled to said second electrical terminal structure;
   a fixed-position capacitor structure conductively coupled to said first electrical terminal structure; and
   a variable-position capacitor structure conductively coupled to said second electrical terminal structure, said variable-position capacitor structure being movable relative to said fixed-position capacitor structure to generate a variable capacitance between said capacitor structures.

14. The variable capacitor of claim 13, wherein the substantially air-tight separation member comprises a vacuum bellows.

15. The variable capacitor of claim 14, wherein the vacuum bellows comprises stainless steel.

16. The variable capacitor of claim 13, wherein the current-carrying structure comprises a current-carrying bellows.

17. The variable capacitor of claim 16, wherein the current-carrying bellows comprises a metal having a high copper content.

18. The variable capacitor of claim 16, wherein the current-carrying bellows comprises phosphor bronze.

19. The variable capacitor of claim 13, wherein the current-carrying structure is porous.

20. The variable capacitor of claim 13, wherein the current-carrying structure is perforated.

* * * * *